US007716313B2

(12) United States Patent
Rana et al.

(10) Patent No.: US 7,716,313 B2
(45) Date of Patent: May 11, 2010

(54) POLICY BASED SYSTEM MANAGEMENT

(75) Inventors: Sohail P Rana, London (GB); Michael A Fisher, Ipswich (GB); Paul F McKee, Colchester (GB)

(73) Assignee: British Telecommunications public limited company, London (GB)

( * ) Notice: Subject to any disclaimer, the term of this patent is extended or adjusted under 35 U.S.C. 154(b) by 900 days.

(21) Appl. No.: 10/507,897

(22) PCT Filed: Mar. 27, 2003

(86) PCT No.: PCT/GB03/01331

§ 371 (c)(1),
(2), (4) Date: Sep. 17, 2004

(87) PCT Pub. No.: WO03/084130

PCT Pub. Date: Oct. 9, 2003

(65) Prior Publication Data
US 2005/0172015 A1    Aug. 4, 2005

(30) Foreign Application Priority Data
Mar. 27, 2002    (EP)    .................................. 02252227

(51) Int. Cl.
*G06F 15/173* (2006.01)
(52) U.S. Cl. ..................................................... 709/223
(58) Field of Classification Search .................. 709/223
See application file for complete search history.

(56) References Cited
U.S. PATENT DOCUMENTS

| 5,777,549 | A | 7/1998 | Arrowsmith et al. | |
| 5,872,928 | A * | 2/1999 | Lewis et al. | 709/222 |
| 5,889,953 | A * | 3/1999 | Thebaut et al. | 709/221 |
| 5,913,037 | A | 6/1999 | Spofford et al. | |
| 6,158,010 | A | 12/2000 | Moriconi et al. | |
| 6,243,747 | B1 * | 6/2001 | Lewis et al. | 709/220 |
| 6,282,568 | B1 | 8/2001 | Sondur et al. | |
| 6,314,555 | B1 * | 11/2001 | Ndumu et al. | 717/101 |
| 6,327,618 | B1 * | 12/2001 | Ahlstrom et al. | 709/223 |
| 6,330,586 | B1 | 12/2001 | Yates et al. | |
| 6,393,473 | B1 * | 5/2002 | Chu | 709/223 |
| 6,466,932 | B1 * | 10/2002 | Dennis et al. | 707/3 |
| 6,697,851 | B1 * | 2/2004 | Althaus et al. | 709/220 |
| 6,718,392 | B1 * | 4/2004 | Krause | 709/238 |
| 6,950,818 | B2 * | 9/2005 | Dennis et al. | 707/3 |
| 7,065,565 | B2 * | 6/2006 | Dini | 709/222 |

(Continued)

FOREIGN PATENT DOCUMENTS

EP        1122932 A2        8/2001

(Continued)

OTHER PUBLICATIONS

Marshall et al., "Active Management of Multi-service Networks", 2000 IEEE.

(Continued)

*Primary Examiner*—David Y Eng
(74) *Attorney, Agent, or Firm*—Nixon & Vanderhye P.C.

(57) ABSTRACT

A computer network includes a plurality of components governed by policies from a policy manager. Where conflicts arise between policies, a conflict management policy is inherent in the system and is implemented to detect and resolve such conflicts.

10 Claims, 12 Drawing Sheets

U.S. PATENT DOCUMENTS

| | | | |
|---|---|---|---|
| 7,103,626 B1 * | 9/2006 | Recio et al. | 709/201 |
| 7,171,459 B2 * | 1/2007 | Sanghvi et al. | 709/223 |
| 7,240,015 B1 * | 7/2007 | Karmouch et al. | 705/4 |
| 2003/0074355 A1 | 4/2003 | Menninger et al. | |
| 2003/0078845 A1 | 4/2003 | Hoffman et al. | |
| 2003/0078846 A1 | 4/2003 | Burk et al. | |
| 2003/0078860 A1 | 4/2003 | Hoffman et al. | |
| 2003/0078861 A1 | 4/2003 | Hoffman et al. | |
| 2003/0083909 A1 | 5/2003 | Hoffman et al. | |
| 2003/0083918 A1 | 5/2003 | Hoffman et al. | |
| 2003/0083947 A1 | 5/2003 | Hoffman et al. | |
| 2003/0088449 A1 | 5/2003 | Menninger | |
| 2003/0088474 A1 | 5/2003 | Hoffman et al. | |
| 2003/0097317 A1 | 5/2003 | Burk et al. | |

FOREIGN PATENT DOCUMENTS

| | | | |
|---|---|---|---|
| EP | 1143660 A2 | 10/2001 | |
| WO | 01/29663 | 4/2001 | |
| WO | WO 97/37477 | 5/2007 | |

OTHER PUBLICATIONS

Lupu et al., "Conflicts in Policy-Based Distributed Systems Management", IEEE Transactions on Software Engineering, vol. 25, No. 6, Nov./Dec. 1999.

Masolo et al., "An XML Based Programmable Network Platform", Proceedings of the ICSE Workshop on Softare Engineering and Mobility, Toronto, CA 2001, May 2001, pp. 1-5, XP002231102.

European Search Report dated Sep. 4, 2002 (from U.S. Appl. No. 10/507,902).

International Search dated Aug. 20, 2003 (from U.S. Appl. No. 10/507,902).

* cited by examiner

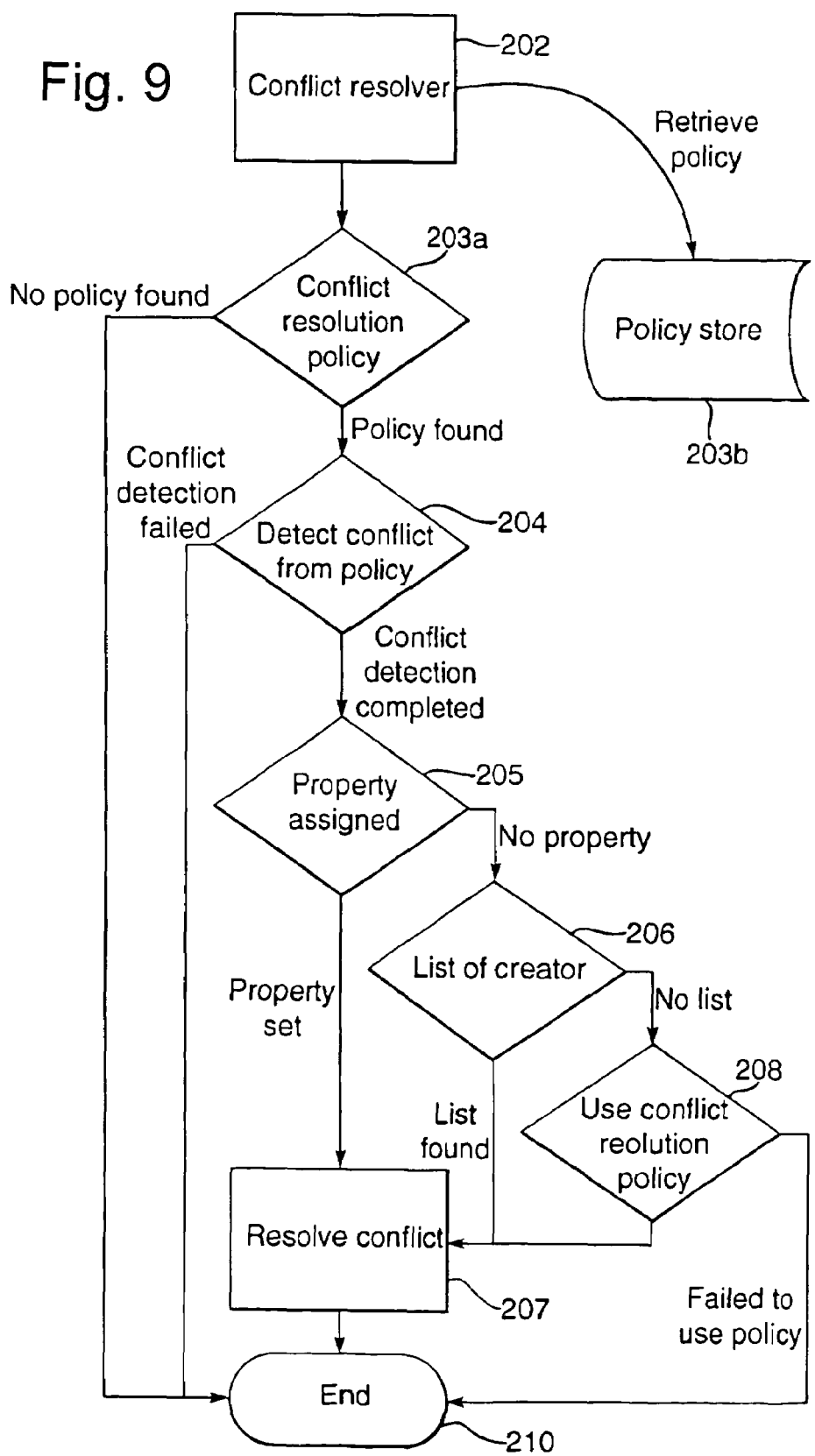

POLICY BASED SYSTEM MANAGEMENT

This application is the US national phase of international application PCT/GB03/01331 filed 27 Mar. 2003 which designated the U.S. and claims benefit of 02252227.0, dated 27 Mar. 2002, the entire content of which is hereby incorporated by reference.

BACKGROUND

1. Technical Field

The invention relates to Policy Based System Management especially for distributed computer systems. The invention further relates to conflict resolution in computer systems.

2. Related Art

Distributed systems are a well known phenomenon for large organisations. Such systems consist of a large number of heterogeneous components and the systems and their components provide significant management burdens for system administrators. Various solutions for management of distributed systems such as Open View (Hewlett Packard) and TeMIP (Compaq) are available but these require significant manual intervention. As a result as the complexity of the system increases, management capability is further stretched. Most current solutions are centralised and suffer significantly from heterogeneity problems arising from the use in different distributed systems of different types of communication protocols and methods.

Recently attention has been given to system management based on policies, for example the Internet Engineering Taskforce (IETF) policy framework which specifies general requirements for policy based management and applies it to management of internet routers with the intent of making the configuration more straightforward. The open view solution identified above as well as secure policy managers (Cisco Systems) and Policy Based Network Management (PBNM-Intel) all contain implementations based on the IETF policy framework. The existing solutions, however, assume a single point of control with a centralised policy repository and decision making. The known solutions further focus on specific applications such as network quality of service.

Although the use of policies to specify the behaviour of the system is expected to have wider applicability than individual items of network equipment, extending also to software processes running on this equipment, the existing centralised management approach is not a scaleable solution.

FIG. 1 shows a distributed system designated generally 10 including a variety of sub networks 12, 14, 16 each having a range of components 12a, 12b, 14a, 14b, 14c, 16a. The system is controlled from a central point of control 18 which includes a centralised policy manager 20. The problem with this type of system is that it is unlikely that all the policy-controlled elements will themselves be capable of interpreting policies and evaluating appropriate behaviour in response to changing circumstances. The range of components requiring management may be far greater than that considered in most policy based management work.

The particular problem with such systems is the relative inflexibility of the system. Significant front-end manual intervention is often required when further components are added to the system both in updating policies relevant to the additional component and in rewriting existing policies to avoid any conflict problems.

BRIEF SUMMARY

Because a dynamic conflict management policy is implemented, when a new component enters the system it can be accompanied by an appropriate conflict resolution policy without the need to rewrite existing policies. As a result the exemplary embodiment can be used to detect and resolve conflicts between actions. In particular a policy structure is defined to detect and resolve conflict which is supported by the system generally providing generic means for interpreting policies. The administrator can set extra policies to define how conflict can be detected and resolved, for example for each component of the distributed system. Conflicts can be detected and resolved on the fly, for live systems. In particular, the phrase "at run time" refers to the ability of conflict resolution policies to be added at any stage without having to cease operation of the system as a whole. If a new policy is added which causes a conflict with another policy and an explicit conflict policy rule for dealing with the conflict has not yet been written and dynamically adopted by the components within the system, the conflict resolution mechanism at a local component will still be able to detect the conflict prior to carrying out either of the conflicting policies, and the details of the conflicting policies are pushed up the tree of the system until eventually a high enough level component will resolve the conflict one way or another using a few overriding rules (eg according to the level of priority ascribed to the authors of the respective policies, or according to the age of the policies, etc.). As soon as a programmer (eg the author of the new policy which has resulted in the new conflict) becomes aware of the possible conflict, a conflict resolution policy may be written and dynamically loaded into the system whereupon it will be automatically disseminated to those components which need to know about it, and they will automatically update their conflict resolution strategies accordingly such that in future such conflicts can be automatically resolved without requiring the conflict to be pushed up to a high level.

Preferred elements of the present invention, which are set out in the dependent claims, address various problems with known systems. By the provision of a distributed policy based manager a single point of control is avoided. System components can delegate (or have delegated by a third party) their policy handling responsibilities to a local instance of the management agent which will then monitor significant changes in this system environment, and evaluate and initiate the appropriate control actions. In this way, policy handling is carried out automatically, close to the managed entities and without the need for centralized co-ordination. By adopting a flexible, extensible definition of policy the exemplary embodiment provides a generic means for interpreting policies and evaluating a desired behavior without specific knowledge of the managed components. The exemplary embodiment takes into account the fact that most network equipment has a considerable amount in common such that many management functions can be widely applied. Even though application software can be very diverse, the management solutions provided by the exemplary embodiment provide the relevant flexibility to deal with them, The preferred implementations of the present invention accordingly provide autonomous, and decentralised management accommodating heterogeneous component management. In the preferred embodiment the invention uses XML based policies, generally triggered by XML events. As a result the management agent can manage this system with the help of events and policies without the intervention of the outside entity. Because of the nature of XML and in particular as it is text based, it can be used to communicate with a wide range of heterogeneous systems.

Yet further, by provision of an automated registration step, faster and more efficient system update and enhancement is available.

BRIEF DESCRIPTION OF THE DRAWINGS

Embodiments of the invention will now be described by way of example with reference to the drawings of which:

FIG. 9 shows a conflict resolution flow diagram according to the present invention;

FIG. 11a shows conflicting policies in XML;

DETAILED DESCRIPTION OF EXEMPLARY EMBODIMENTS

In overview, the exemplary embodiment provides a distributed policy-based manager where policies are maintained and implements on a series of management agents distributed around a network, for example as part of a sub-network. When a new component registers with a local management agent, relevant policies are obtained and stored at the agent a the same time. The component will then be controlled taking into account relevant policies under the management of the local management agent. In addition, the component will include any relevant conflict resolution policies as part of the policy stored at the local agent. The local agent is also configured to detect conflicts between policies and implement an appropriate conflict resolution routine taking into account any stored conflict resolution policies.

In an automated, distributed approach to management, decision making must be made based on locally available information and according to a set of rules. These rules, which govern choices in the behaviour of the system, are termed policies. Policies allow the users of a system to specify the behaviour they want it to exhibit. More precisely, policies allow selections to be made from a range of options provided by the designer of a host, router, application or other resource. These selections can be specified in terms of a set of conditions with associated actions. When a policy is triggered, conditions involving locally available information can be evaluated and the appropriate actions initiated. This allows flexibility to be built into a system by supporting a range of different behaviours rather than hard-coding a particular behaviour—essentially fixing the policy at design-time rather than run-time.

A policy-based, distributed approach as provided by the invention allows considerable flexibility in management. Management system components can be organised in a hierarchy, each with a set of policies controlling its decision making. Management issues can be resolved at as low a level as possible, only referring to a higher level when necessary. In this way, problems of heterogeneity and scale can be handled by a "divide-and-conquer" approach, and speed of response can be achieved by resolving problems locally.

Figure 1:
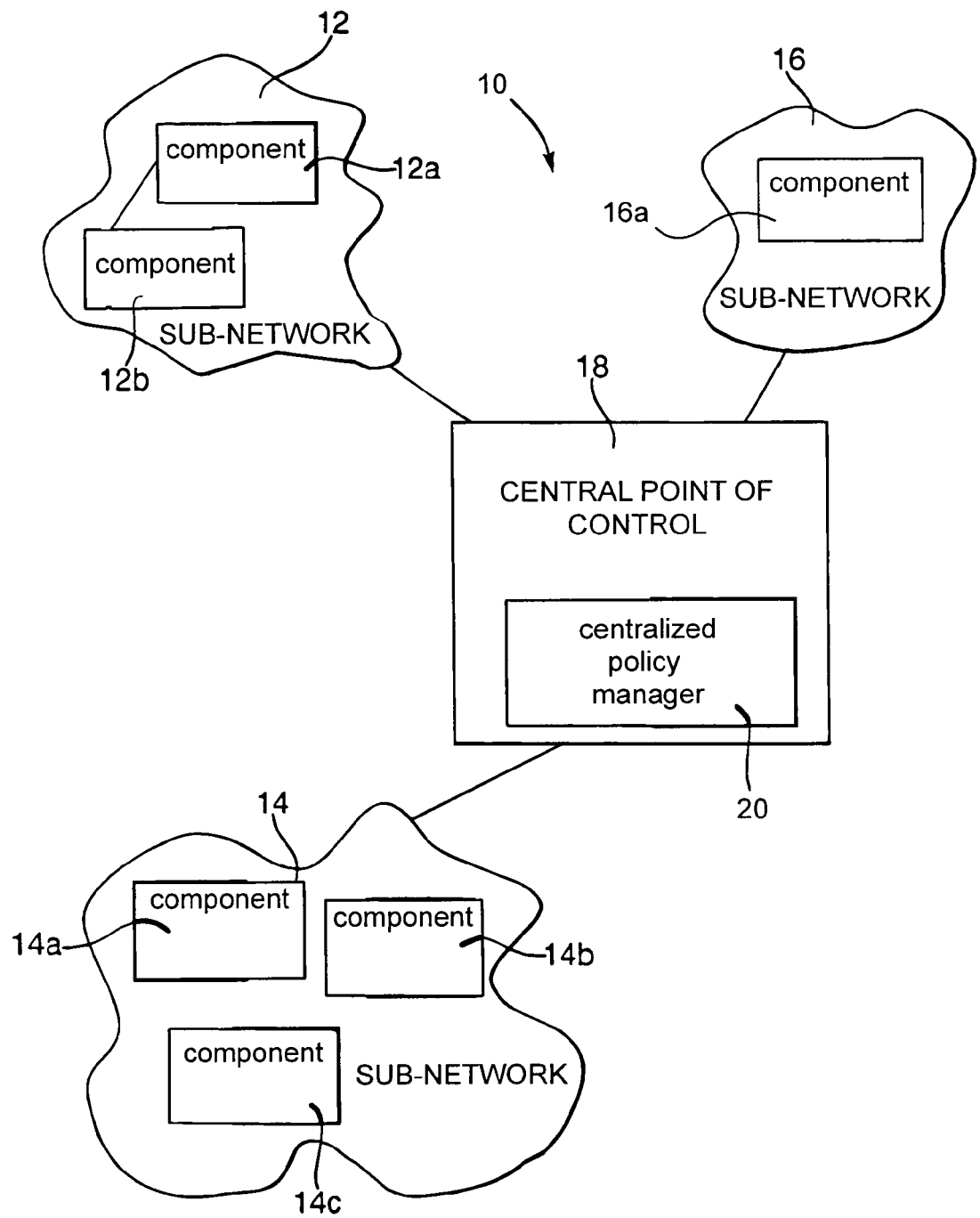
FIG. 1 shows a policy-based management system according to the prior art.
Figure 2:
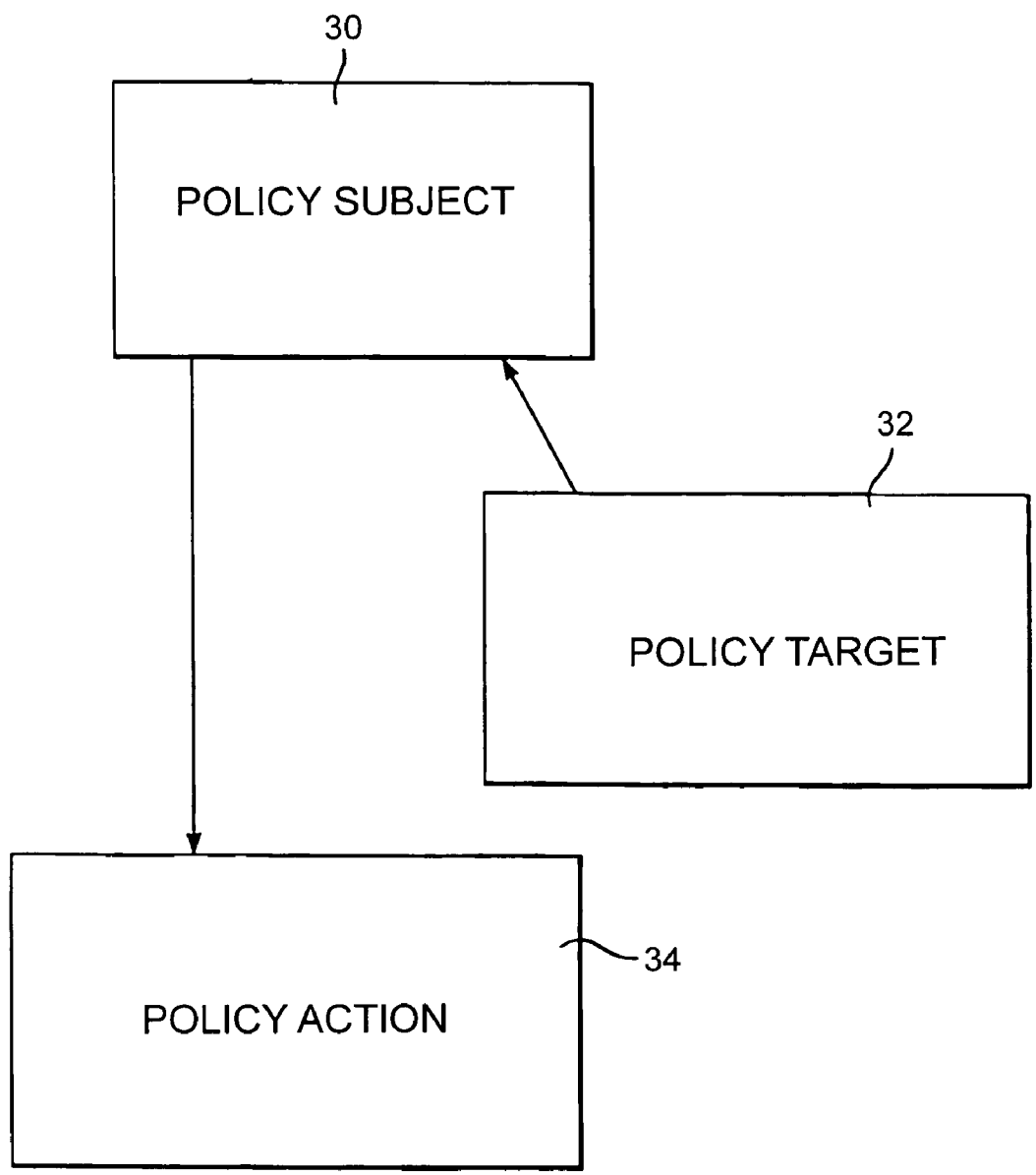
FIG. 2 shows the basic components of a policy-based approach.
Figure 3:
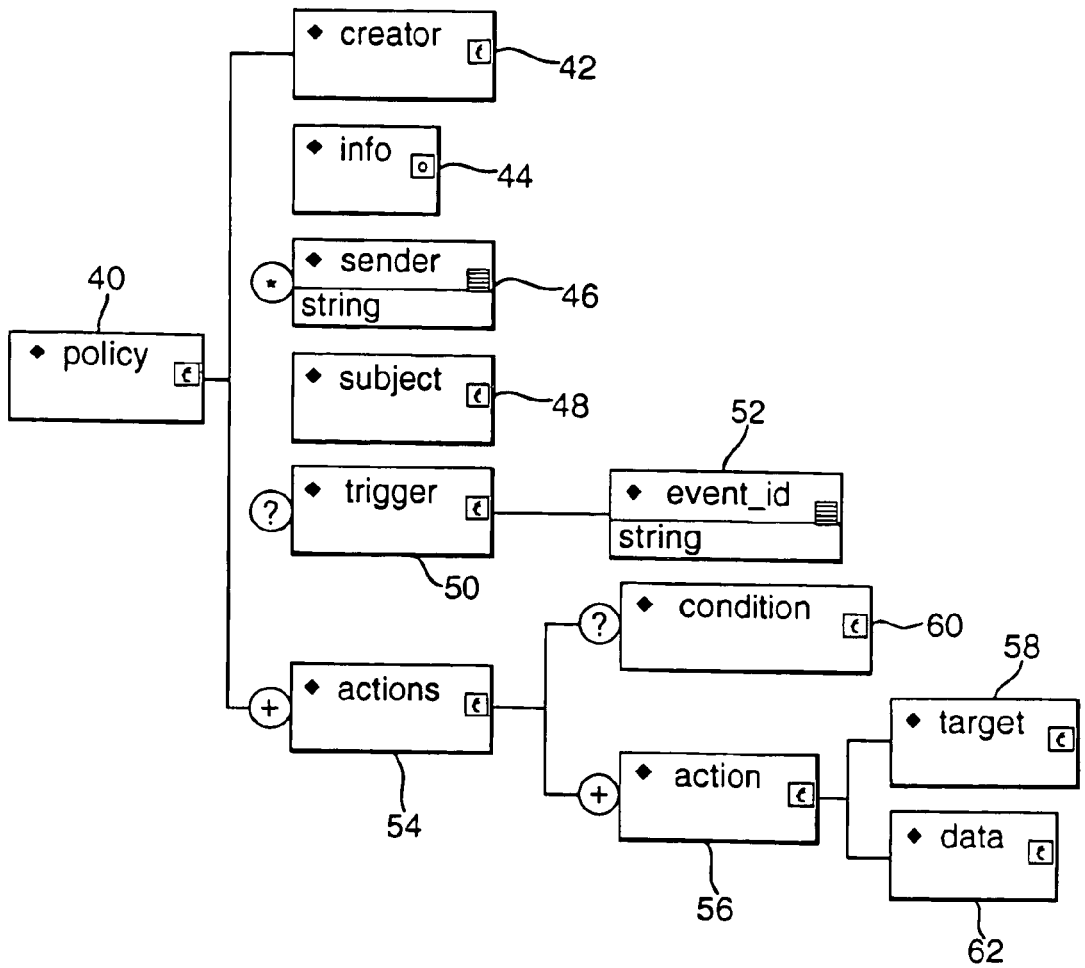
FIG. 3 shows the overall structure of a policy according to the invention.

The general structure of a policy is shown in FIGS. 2 and 3. Referring to FIG. 2 first of all, the policy has three principle parts to it, subject 30, target 32 and action 34. The subject 30 and target 32 are components distributed within the system and can, for example, be the same component. The policy is written to control the subject 30, which is the entity expected to act on the policy. The policy in particular associates the subject 30 with the action 34 which should be performed on the target 32.

The overall structure of a policy 40 is shown in FIG. 3.

The top level policy specification consists of six elements. The creator element 42 allows the origin of a policy to be established. This policy specification is intended to be applicable in an environment where there are multiple points of control. Components should be able to accept control from users with different privileges. The administrator of a router, for example, will have ultimate control of its configuration, including the permitted extent of control by other users. End users may be allowed to control the way the router behaves for their own traffic. Furthermore, as discussed in more detail below, knowledge of the creators of a number of conflicting policies can allow priorities to be set.

The info element 44 contains most of the information about the policy which is not directly related to the policy rules. It includes a globally unique identifier for the policy ("policy-id") and an indication of the modality of the policy (positive authorisation—what the subject must do, negative authorisation—what the subject may not do or refrain—what the subject should not do). The intention is that the modality should not be mixed within a single policy. The general policy handling components of the management system, which have no detailed knowledge of the specific rules contained in the policy, may then take advantage of this classification. It may also contain a textual description of the policy. The creation time, start time and expiry time of the policy can also be specified. Finally, a list of policies replaced by the current policy may be specified. Policies are considered to be immutable so different versions are not possible. However, a flexible "data" element is provided as discussed in more detail below.

The sender element 46 identifies the forwarding path the policy has taken. This information could be used as a check that the policy has followed an expected route, or to establish that the policy has already been received by other parts of the system. This element may be modified between creation and receipt of the policy and would therefore not be subject to digital signing.

The subject element 48 identifies those entities (e.g. components) in the system which are expected to respond to a policy. Identification of these entities is done by role. A role is a name for a group (zero or more members) of related members. This is important so that a policy can refer to entities which are not present or not known at the time of creation if they can subsequently be linked with the role.

The optional trigger element 50 relates an event (via its unique event type identifier "event-id" 52) to the policies that are supposed to handle it. When an event is detected, relevant policies must be activated. It is assumed that a policy is triggered by a single event. If there is no trigger 50 it is assumed that the policy 40 is activated as soon as received.

Every policy includes one or more actions elements 54. These specify the behaviour (action 56) that should result from the triggering of the policy 40 (to the targets) which are defined in the action. Each actions element 54 contains an optional condition expression 60 and a set of strings specifying actions (data 62) to be taken on particular target components. These actions can use the open content features of XML schema to allow tags appropriate to any particular system to be included in a policy instance. This is enabled by the data element 62 which can, for example be a reference to a software component and provides a high level of flexibility in defining the policy, without requiring rewriting of the whole policy.

The distributed policy-based management system of the invention is now described in more detail with reference to the local management agents forming the distributed system. Generally speaking a component (for example, a subject 30) registers with a management agent, and the management agent obtains all the relevant policies and stores them locally. When an event comes to the system, the management agent simply looks through the local database and sends the appropriate action (within the policies) to the targets.

Figure 4:
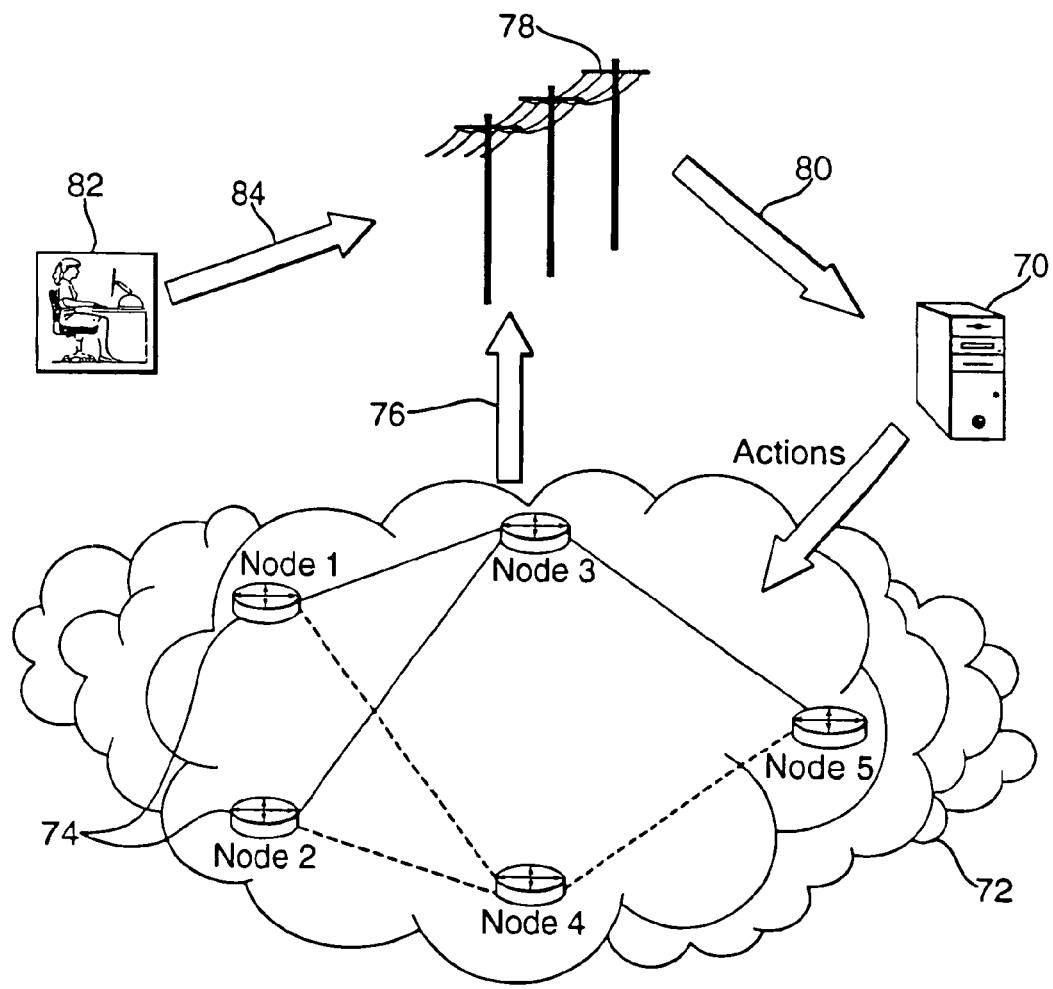
FIG. 4 shows a distributed management system according to the present invention.

A representative management agent is shown in FIG. 4. The agent 70 is associated with a sub-network 72 of a distributed system having a plurality of Nodes 74. The subnet 72 communicates with the management agent via a communications channel 76 and an appropriate medium such as the telephone system 78. Policies and events 80 are received by the management agent 70 from the communications medium 78 and can arise either from system events or from actions by an administrator 82. The management agent 70 is one of a plurality of agents associated with sub-networks of the full distributed network.

Though the management agent 70 is generic and can be used to manage a wide range of distributed components, in this example we consider dynamic routing. We assume there are a number of routers 74 within the sub-network 72 (Node 1-5).

The management agent 70 configures and manages these routers 74. The administrator 82 (or other appropriate means) registers the routers 74 with the management agent 70 and writes or provide pointers to the policies 84 that can be used to configure the routers 74. Once the routers 74 are registered, the management agent 70 downloads all the policies (in this case path configuration policies) associated with the routers 74 and configures their communication paths. Let us assume that the communication paths are from Node 1 and Node 2 to Node 5 through Node 3. Once these paths are established the packets should flow through the network. But assume further that Node 3 has some limitation on how many packets it can handle, in other word the Node 3 will get congested soon and send a congestion event to the management agent 70 (via the communication channel). Now the management agent 70 will retrieve more policies associated with the event and send the appropriate actions to the routers 74. For example the packets will be rerouted via Node 4.

Looking now at the implementation of the invention in more detail, the Management Agent 70 is an autonomous system to manage the distributed components with the help of policies and events. The policies, which are written to manage the components (e.g. nodes 74) are stored somewhere in the network. Both the target component and the subject components (which in the example above are the same components), i.e. the nodes 74 need to be registered with the management agent 70. As a component is registered, the management agent 70 retrieves all the policies related to that component and stores them locally. Now the agent 70 listens (e.g. to an event channel) for the events that are associated with the policies. If an event occurs, the management agent retrieves (from the local store) the appropriate policies, evaluates conditions, resolve conflicts and send the action(s) to the target components(s).

Figure 5:
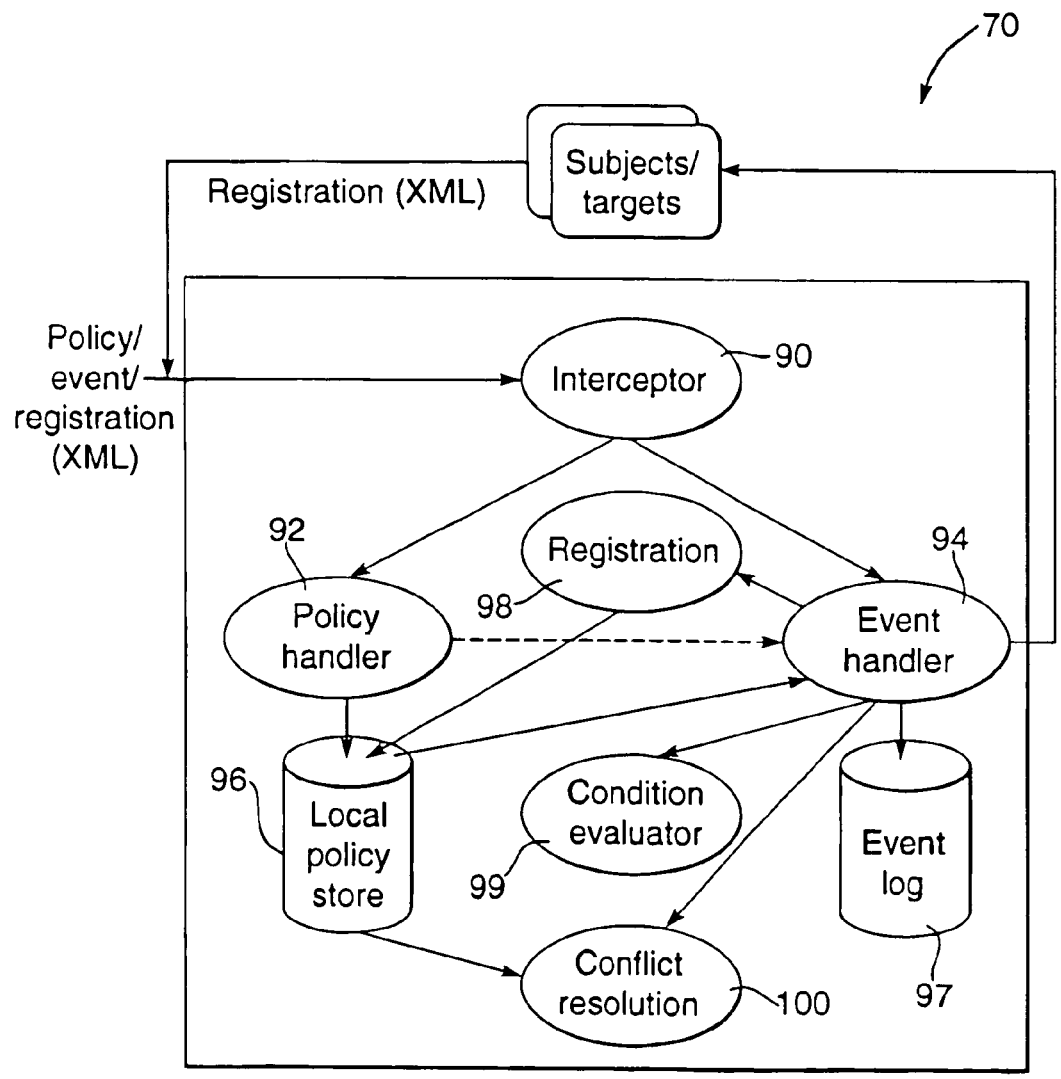
FIG. 5 shows a management agent according to the present invention.

FIG. 5 describes the overall system and the components of the management agent 70.

The interceptor 90 is the entry point for the system and initiates all the components of the Management Agent 70. Since in the preferred embodiment all messages are in XML, the interceptor 90 distinguishes among different types of messages (policy, event etc) and sends them to the appropriate component. The interceptor 90 also includes a multithreaded first in first out queuing system for the XML messages.

The basic possible cases intercepted by the interceptor 90 are:

subject delegates—the subject (or some entity on behalf of the subject) delegates its management to the management agent by sending a registration event. The registration information is stored with the system.

Target registers: to target (or some entity on behalf of the target) registers itself with the management agent by sending a registration event, so the management agent can locate the target to deliver the actions. The registration information will be stored with the system.

Policy sends to the agent: the policies are sent to the management agent (for example by a policy manager) and if the policies are meant for the registered subject the policies will be stored.

Events come to the system: for generic events, the event handling gets all the policies and then sends the actions (within the policy) to the targets after evaluating the condition and resolving the conflict.

When a new policy comes the policy handler 92 checks if the policy is supposed to be triggered by an event or not. If the policy is not triggered, (i.e. triggerless policy) by an event (e.g. no event code for trigger) then it sends the policy to the Event Handler component 94 for immediate execution of policy. If the policy is supposed to be triggered by an event then it checks whether the subject is registered and then stores the policy in the local policy store 96. The policy handler 97 also registers with the event channel for the event type within the policy. If the policy is not for one of its registered Subjects then the policy handler 92 discards the policy.

When events come into the interceptor 90 the event handler 94 logs the event and checks for special events. For example if it is a "registration" event, i.e. event-id is "Registration" and the data part contains the registration XML then it sends the registration information to the Registration component 98. If the event is a normal event then it gets all the policies relating to that event from the local policy store 96. Then it sends all policies to the condition evaluator 98 to evaluate the conditions. After condition evaluation it counts all policies and if the number of policies is more than one then it uses the conflict resolver component 100 to resolve conflict as discussed in more detail below. Once the conflict resolution is done, the actions are sent to the target object 34.

Figure 6:
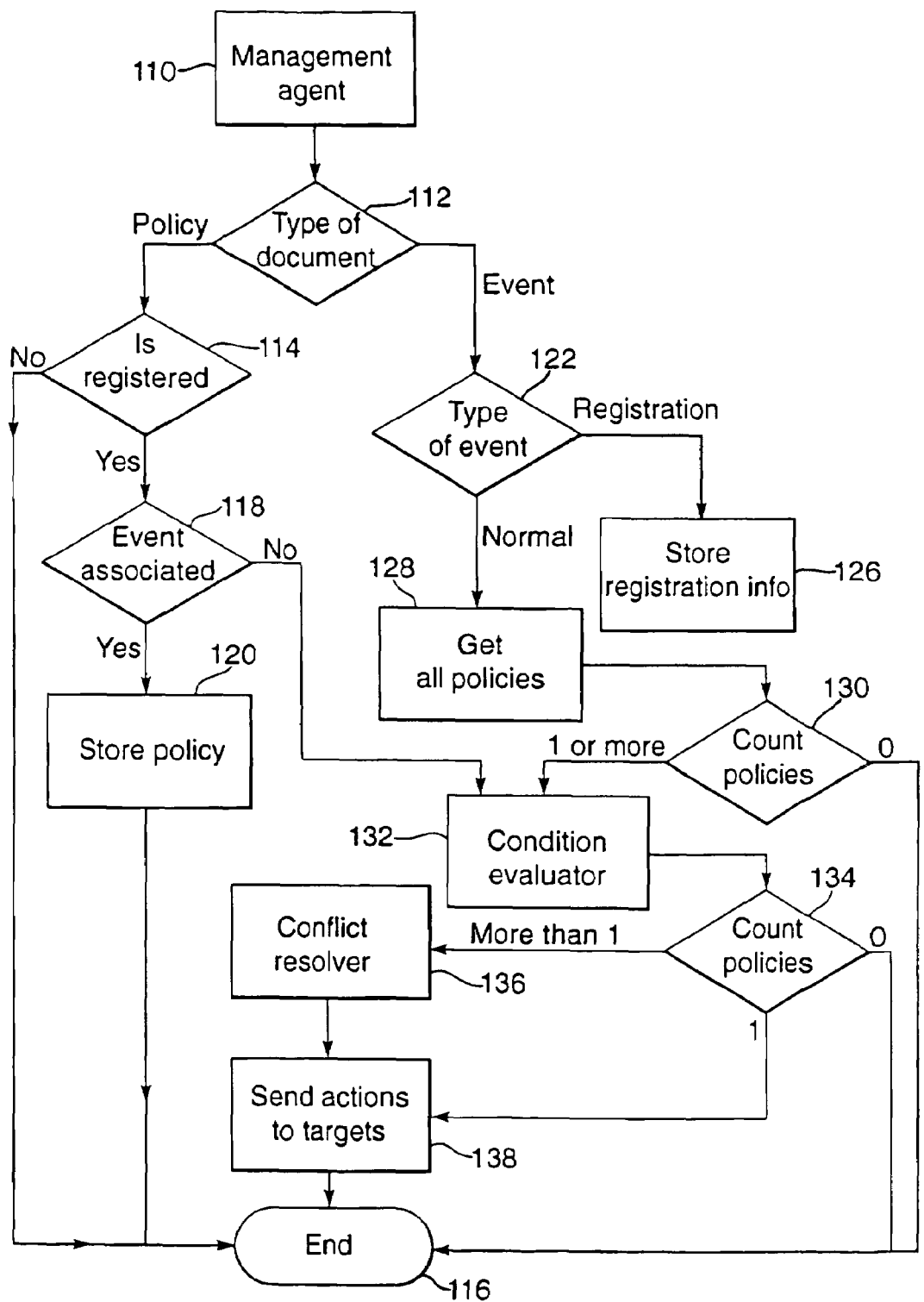
FIG. 6 shows a management agent flow diagram.

The "registration" event is now discussed in more detail. The registration relates to subjects/targets which comprise new components joining the system and hence requiring management by the management agent. Referring to the flow chart in FIG. 6, at step 110 the management agent in the form of the interceptor 90 intercepts an XML document which is assessed at step 112 to establish whether it is a policy or an event. If it is a policy the policy handler 92 assesses whether it is registered and if not the routine ends at step 114.

If at step 114 the policy is registered then at step 118 the policy handler 92 assesses whether there is an event associated. If there is, then the policy is stored at step 120 in policy store 96. If no event is associated then the policy proceeds to condition evaluator 98 at step 122. The condition evaluator step is described in more detail below.

If the intercepted document is assessed at step 112 to be an event then at step 122 the type of event is assessed by the event handler 94. If the event is a registration event then the registration information is stored at step 126. For any other type of event all related policies are accessed from the policy store 96 at step 128. The number of policies is then counted at step 130. If there are no policies associated with the event then the routine ends at step 116. However, if there are on or more policies related to the event then the system proceeds to the condition evaluator step 132. At step 134 the policies are counted. If there are zero policies then again the system proceeds to the end at step 116. If there is more than one policies then the conflict resolution element 100 is engaged at step 136. Once the conflict is resolved the resolved policy is implemented and the relevant actions are sent to the relevant targets at step 138. Reverting to step 134 if only one policy is counted then the system jumps straight to step 138 and implements the policy. The routine then ends at step 116.

Figure 7:
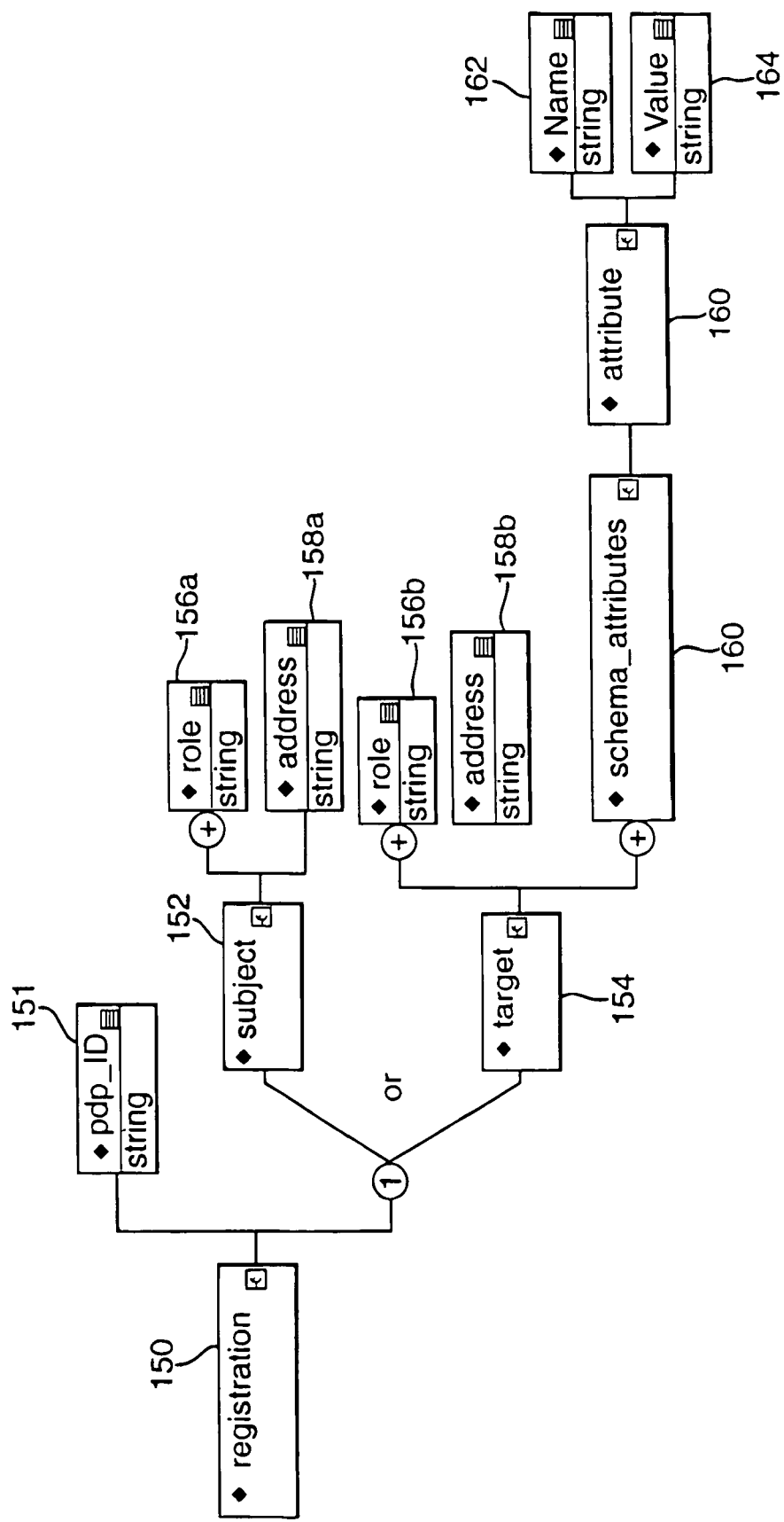
FIG. 7 shows the structure for registration of a subject or target according to the invention.

FIG. 7 shows the structure for registration which relates to the registration of subjects and targets. Registration comprises a special type of event as illustrated in the schema of FIG. 7.

This schema 150 can be used to either register the subject 152 or the target 154. Every component (e.g. target 154, subject 152) has one or more role 156a,b (e.g. admin, user etc) and one address 158a,b (to locate the component). The schema has a pdp_ID 151 allowing unique identities to be adopted for individual management agents. The role is interpreted as a prioritise list, which may help to resolve conflicts. For this target 154 the system needs some extra information about the actions (also expressed in XML), that can be handled by target 154. The schema_attributes 160 element can be used for this purpose, for example the name 162 and value 164 elements can be used to describe the namespace and x-path values of the action documents (see the discussion below). When a subject is registered the system gets all the policies as governed by the role element 156 which bears a policy-id from the external policy store and then stores them in the local store 96. The XML representation of subject registration is shown below.

```
<?xml version = "1.0"?>
<registration xmlns = "http://www.bt.com/management_agent/
registration"
    xmlns:xsi = http://www.w3.org/2000/10/SMLSchema-instance
    xsi:schemaLocation = <"http://www.bt.com/management_agent/
    registration
    http://www.bt.com/management_agent/regisration/registration.xsd">
    <pdp_ID>PDP</pdp_ID>
    <subject>
        <role>Nod X</role>
        <address>www.nodex.com</address>
    </subject>
</registration>
```

As discussed above, registration on 150 is one event that can be intercepted by the management agent interceptor 90. In addition, as also discussed above, policies can be intercepted for example, policies loaded into the system by a system administrator and requiring allocation amongst the distributed policy manager. Further still a range of events can be intercepted which can, for example, trigger various policies. These are now discussed in more detail.

Figure 8A:
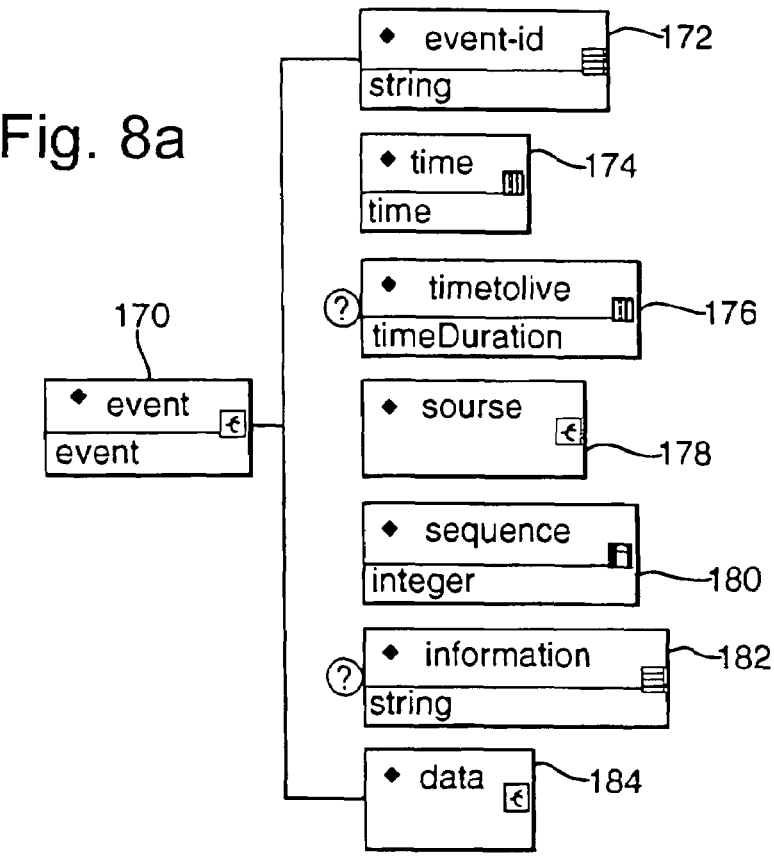
FIG. 8a shows an event structure according to the present invention.

The structure of an event is shown in FIG. 8a. Its purpose is to provide sufficient information to allow generic components to be used in the distribution of events to all interested entities but also to allow any additional information to be included to support specific circumstances. An event following the syntax specified here may be generated either directly or by an XML-aware component or by a special monitoring component which obtains information using some other mechanism.

The top level event specification consists of seven elements. Each event type has a unique event-id 172, a globally unique string which may be used to trigger appropriate policies. Typically this will be used as a key into a store of policies. The time element 174 identifies when the event occurred while the optional timetolive element 176 specifies for how long the event is relevant. Use of this information can allow certain events to be discarded if not handled in time, limiting unnecessary management traffic. The source element 178 identifies where the event originated. The sequence element 180 is an integer which is incremented with each event produced from a particular source. This can support partial ordering of events which may be useful, for example, in correlation of events from a single source. The optional information element 182 is a text string intended to be read by people rather than processed automatically. The data element 184 has an open content model and allows any well-formed XML to be included. This is where any specific information about the event can be included, using whatever structure is most appropriate. The data element 184 agent introduces a degree of flexibility into the schema. As with policy actions, it is only necessary that the event producer and the interested recipients share knowledge of the contents of this element.

The system shown in FIG. 5 further includes a condition evaluator 98 to assist in assessing whether a policy or event meets the relevant conditions.

Conditions are associated with the actions within the policy. A condition may state for example that, if it is after 6 p.m. then do not allow user X to log in. Some conditions can be evaluated using system information, information within policy or information within event. But there may be conditions where the system needs some extra information to evaluate them. This extra information can be sent to the system as policies (the action part 56).

Figure 8B:
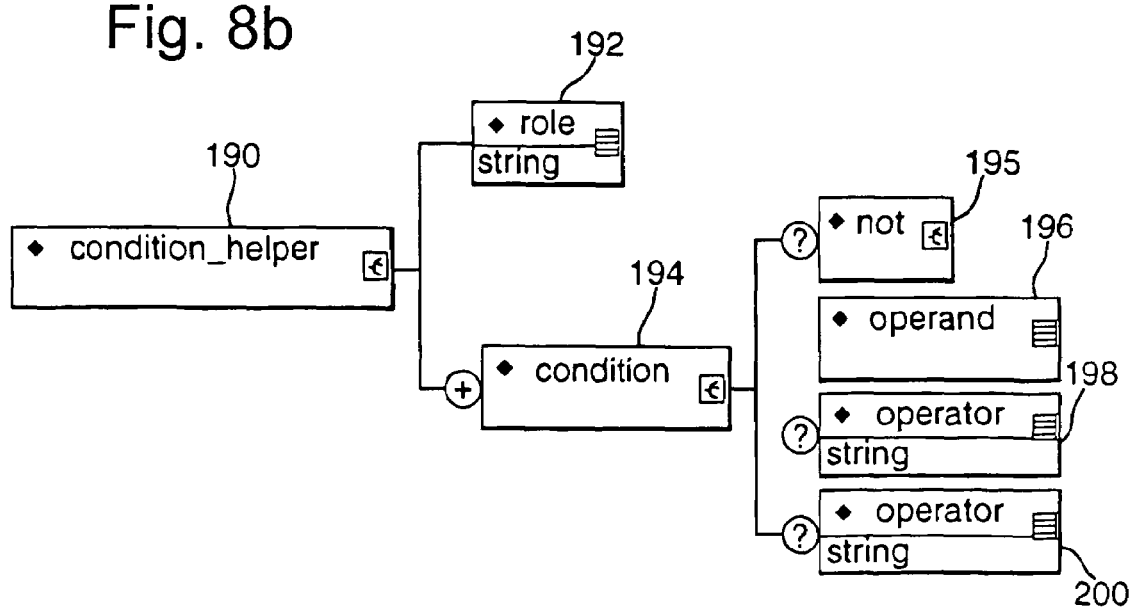
FIG. 8b shows a condition evaluation structure according to the present invention.

A schema 190 has been defined for this purpose, which is shown in FIG. 8b. The condition Evaluator component will try to evaluate the condition with the help of all this information.

The role element 192 specifies the target and the condition 194 (which can be more than one) describes how to evaluate the conditions. The first operand element 196 can be "Time", the second operand 198 can be "6 p.m." and the operator 200 can be equal, greater than etc. The not element 195 describes the inverse of the whole condition.

When a policy is triggered by an event, the event handler identifies the targets (from the action expression of policy) then it sends the details to the condition evaluator component. The condition evaluator component looks for condition_helper 196 policy for that particular target to evaluate the condition. Two further components of the management agent 70 requiring further discussion are the local policy store 96 and the event log 97. The policy store stores the policies preferably in a lightweight XML database, for example, XSet and the events are logged similarly using an XSet database. As mentioned above, all of the components of the management agent are preferably configured using XML policies (it is, internal component policies). For example, to aid condition evaluation or conflict protection and resolution the system administrator may set different policies. The use of XSet allows XML documents to be stored and queried easily using local disk and memory.

As mentioned above, a problem with known systems and also with distributed policy based management systems is that of conflict between policies. The management agent 70 shown in FIG. 5 further includes a conflict resolution element 100.

The Conflict Resolution component 100 can be used by the Management Agent 70 to detect and resolve conflict between actions. Conflict resolution is important for any type of policy driven system. As the management of the distributed system should also be distributed, and therefore lacks a central point of control. One of the implications of this is the potential for several administrators to apply policies at many points throughout the network. Due to this reason conflict resolution is essential for the distributed management system.

Although policy based management has been extensively studied, there are few conflict resolution techniques/mechanisms available. This is mainly because most of the thinking behind the policy based management is centralised and considered to be managed by single administrators, so there are few chances for conflicts. There is some consideration of the problem in "Conflicts in Policy-based Distributed Systems Management" E. C. Lupu, M. Sloman, IEEE Transactions on software engineering, Vol. 25, No. 6, November/December 1999) but this relates to static conflict detection and resolution, appropriate to a centralised system, and is therefore used on the policies before they are sent to the policy manager.

Turning to the policy structure discussed above, policies are written using XML and the actions can be of any form (i.e. follow any structure, as defined by the data element 62 in FIG. 3). It is possible that conflict arises within a similar action, referred to here as intra-action or between different actions structures, referred to herein as inter-action. In the discussion below we deal only with intra-action—if an inter-action issue arose then it would be necessary to provide an appropriate XML document for the conflict resolution policy—the policy will thus be of variable length and size with different components.

We assume all the components of the distributed system are registered with the management agent(s) 70 and the management agent 70 can access all the available policies. We also assume that each distributed component (the targets 34) has only one (zero or one) conflict resolution policy. Otherwise more than one conflict resolution policy (for the same component/target) will be conflicting with themselves. Whoever sets this policy (the owner/administrator of the component) must know about all the actions that can be set for (and handled by) this component; one policy can cover all potential conflicts.

When the management agent detects more than one policy for a certain event, it uses the conflict resolution component to detect/resolve conflict. FIG. 9 shows a flow diagram for the conflict resolution process 202, which is described below.

1. The conflict resolver 202 tries to retrieve the conflict resolution policy (203a) from the policy store 203b. If no policy is found then either there is no conflict or the conflict can not be detected (210).

2. If the conflict resolution policy is found, then system checks (204) whether the policy can be used to detect the conflict. If the policy is not set for this conflict then the process ends there (210).

3. If the conflict is detected then the system tries to resolve it, first by looking at the properties (205) (FIG. 4). These properties can be used to describe a code (method or dynamically loadable software) which can be used to resolve conflict (207). The "name" of the "property" (in the schema, FIG. 10 as discussed below) can be used to describe whether the code is a method call or a dynamically loadable code. The "value" of the property can be used to describe the location of the code (e.g. an HTTP address). In the case of our route example as discussed below, the conflict can be resolved by running a separate program that can determine the congestion of "Node X" and "Node Y" then selects the less congested node.

4. If the property is not defined then the component looks for the prioritised list (can be a different policy) of creators (206). If a list is found the conflict resolver will try to resolve the conflict (207) by selecting the policy created by the creator with higher priority.

5. If the prioritised creator list is not available or it can not be resolved by the list (e.g. all the creators are same for all conflicting policies) then the conflict can be resolved by using the actual conflict resolution policy 208 (i.e. the prioritised value as in the listing below). If the policy is detected then, by definition, it will be resolved unless there is a coding or system error (211).

This hierarchical approach of first assessing the properties field to identify a conflict resolution mechanism, secondly addressing the creator field and prioritising accordingly and thirdly, looking to the conflict resolution policy itself ensures that conflicts are dealt with efficiently and consistently. A specific example to which the conflict resolution approach can be applied is now described.

Figure 10:
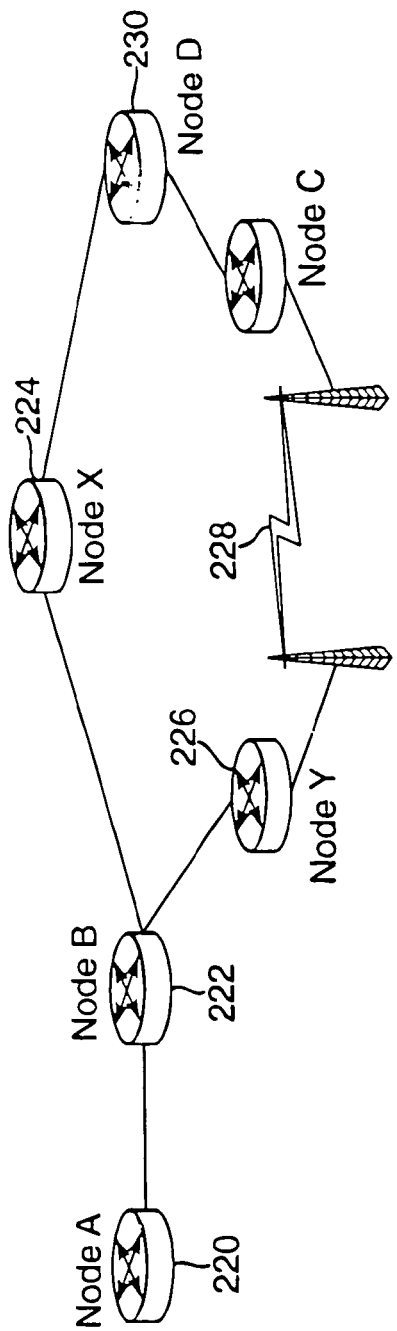
FIG. 10 shows an example of a system encountering a conflict.
Figure 11A:
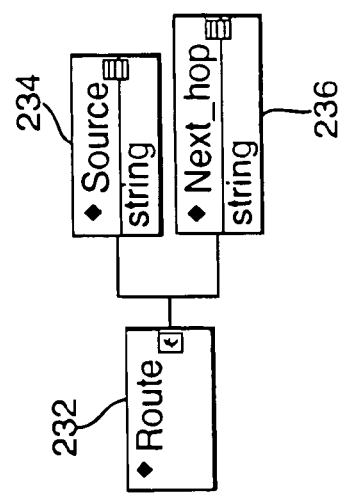
FIG. 11a shows a route schema.
Figure 11B:
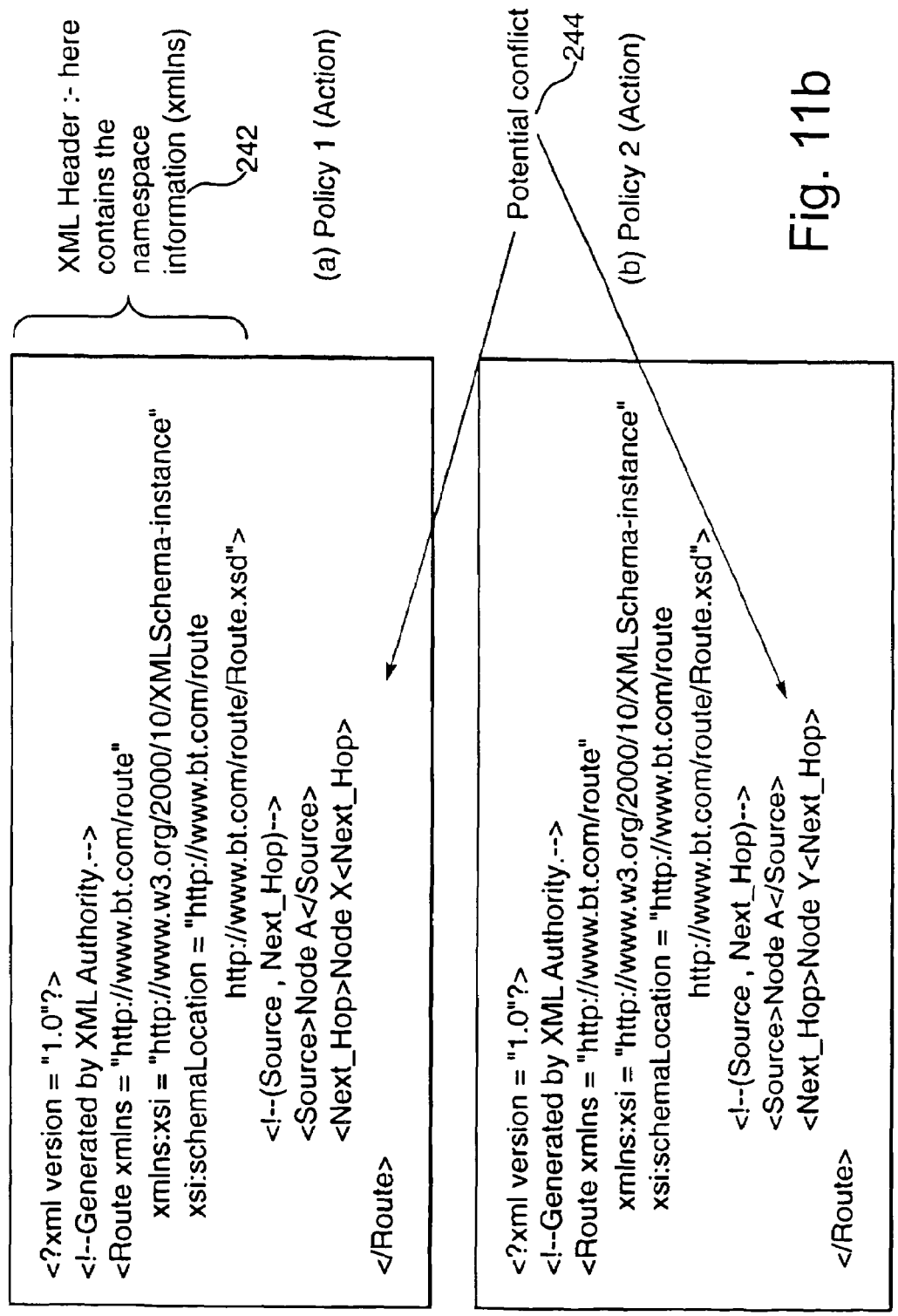

FIG. 10 shows an example router network. Packets coming from Node A 220 can take two routes before it can reach Node D 230. One of the routes (through Node X 220) has higher bandwidth because the other route (through Node Y 226) has a radio link 228 (which is considered to have lower bandwidth). FIG. 11a shows a schema that can be used configure these routers (Nodes) and FIG. 11b shows the XML policies (set for Node B 222) that conforms to the route schema having a route 232, a source 234 and Next_Hop 236. One of the actions says if a packet comes from Node A 220 send it to Node X 224 and the other one says send packet to Node Y 226. Here we may have a potential conflict 244 for Node B 222 ("Next_Hop 236") for the actions (unless Node B 232 is multicasting or broadcasting). But the system can only detect the conflict (and resolve it) if extra information is available about the conflict.

Figure 12:
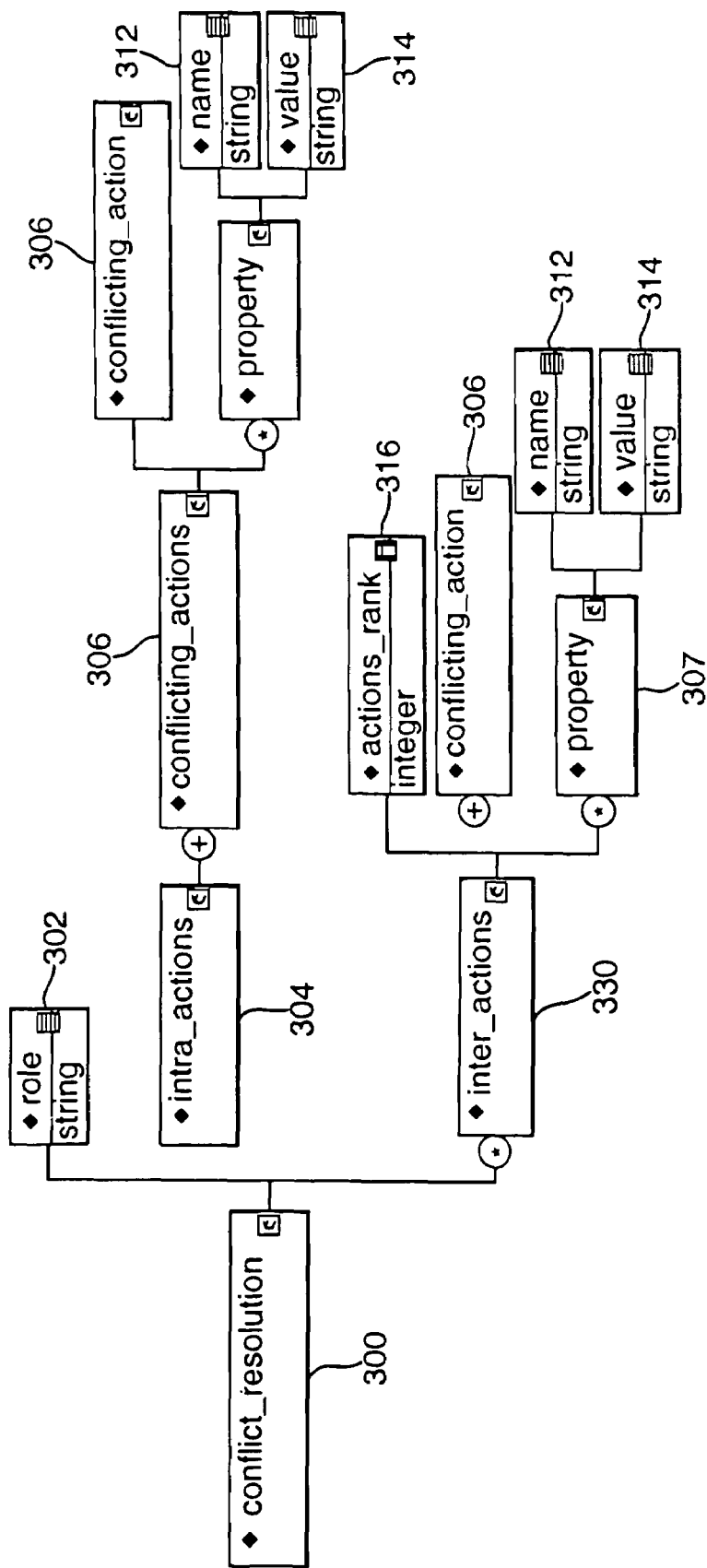
FIG. 12 shows a conflict resolution structure according to the invention.

FIG. 12 shows the conflict resolution policy structure 300 that should be used to set policies for potential conflicts. The elements are described below.

The role 302 defines the actual component (target) of the system which will be affected by the conflicting policies. The intra_action 304 is for the conflicts between the similar structured actions. For our example the routing policies (FIG. 11b) are conflicting with each other (i.e. which route to take). The inter_action 330 is for detecting conflicts within different action structures. For example we can have policies where one says "take route through Node Y" and the other says "Take the route with higher bandwidth". To detect conflict between these two types actions we have to use this structure. The conflicting action element 306 for intra-action is described further below with reference to FIG. 11b. The property 307 can be used to describe other means (see later) to resolve conflict.

Figure 13:
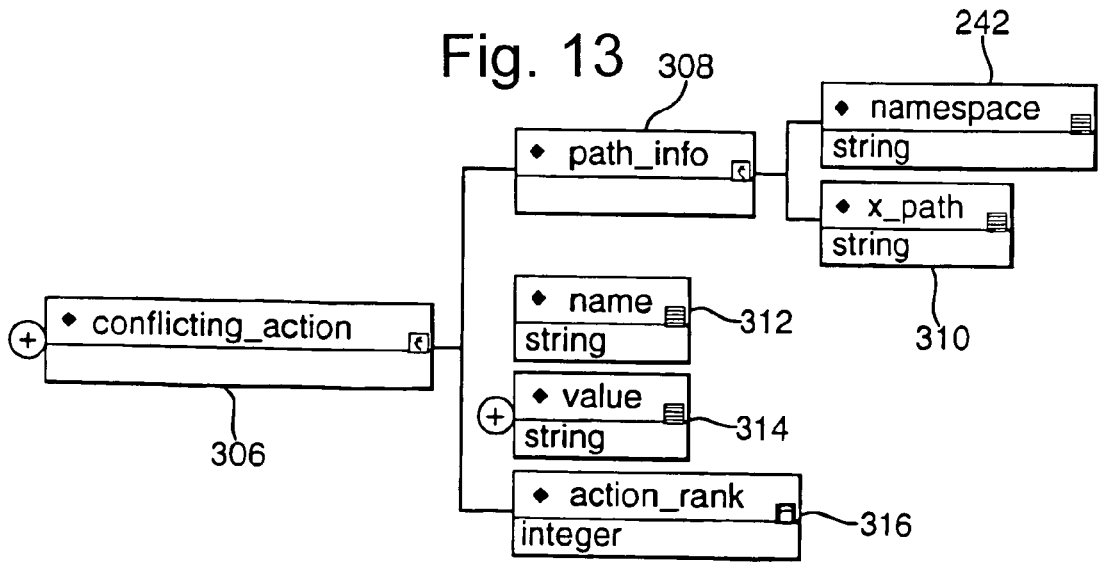
FIG. 13 shows a distributed management agent in combination with the distributed system.

FIG. 13 shows the structure which will be used to detect conflicting actions. The path_info 308 will identify the location of the conflict within the XML document (i.e. the relevant part of the policy), this contains the namespace 242 information which is part of the XML header (FIG. 11b) and the x_path 310 information, for example "Route/Next_Hop" is the path for "Next_Hop" (see Listing 1). The namespace 242 tells us where this name (e.g. Next_Hop) has been defined. The name 312 is the name of the entry (in the action policy), e.g. here the name is Next_Hop, The value 314 would be multiple conflicting values for the name, for example here the conflicting policy saying that there is a conflict between values "Node X" and "Node Y". The action_rank 316 has an integer value that identifies which conflict should be considered first, e.g. lower value will take preference. Also note that each value should be unique.

It will be seen, therefore, how the invention is implemented in XML. In particular, the listing at FIG. 11b represents two conflicting policies and the approach described shows how the two policies are parsed in order to determine to conflict. The action rank element 316 is particularly significant—this identifies the level at which the conflict occurs and determines that it should be dealt with at that level. The first priority action rank is dealt with first and then it is assessed whether any conflicts remain—if so then they are dealt with at the next level of priority and so forth until only one policy is left. This supports a hierarchical approach to the policy management.

A XML listing for a conflict resolution policy relevant in the present instance is as follows.

Listing 1 :– Conflict resolution policy (XML)

```
<?xml version = "1.0"?>
<!--Generated by XML Authority. -->
<conflict_resolution xmlns =
"http://www.bt.com/management_agent/Conflict_resolutor"
xmln:xsi = "http://www.w3.org/2000/10/XMLSchema-instance"
xsi:schemaLocation =
"http://www.bt.com/management_agent/Conflict_resolutor
http://www.bt.com/management_agent/Conflict_resolutor/
conflict_resolution..
xsd">
    <!--(role, intra_actions, inter_actions*)-->
    <role>PDP</role>
    <intra_actions>
        <!--(conflicting_actions+)-->
        <conflicting_actions>
            <!--(conflicting_action, property*)-->
            <conflicting_action>
                <!--(path_info, name, value+, action_rank)-->
                <path_info>
                    <!--(namespace, x_path)-->
                    <namespace>http://www.bt.com/management_
                    agent/Conflict_resolutor</namespace>
                    <x_path>Route/Next_Hop</x_path>
                </path_info>
                <name>Next_Hop</name>
                <value>Node X</value>
                <value>Node Y</value>
                <action_rank>1</action_rank>
            </conflicting_action>
            <property>
                <!--(name, value)-->
                <name>N/A</name>
                <value>N/A</value>
            </property>
        </conflicting_actions>
    </intra_actions>
</conflict_resolution>
```

This represents the detection and resolution phrases discussed above. As can be seen the listing is a policy for Intra-actions and includes a property field allowing for example down loading of an appropriate resolution sub routine. The path info field defines where the conflict can be found and also provides the priority (Node X over Node Y) event that the conflict resolution policy itself is addressed to resolve the conflict.

Although the discussion above relates to implementation of the invention using XML documents, any appropriate implementation can be adopted.

As will be appreciated by those in the art, a method for implementing this invention can be realized by executing a computer program comprising processor implementable instructions for causing a processor to carry out the method during execution of the program which may be contained within a computer readable program storage medium.

What is claimed is:

1. A computer network management system comprising a distributed policy-based manager which comprises, for each of a plurality of sub-networks of said computer network management system, an associated management agent, each sub-network including a store arranged to store policy-conflict resolution policies for one or more components in said sub-network, wherein each said sub-network management agent incorporates:
    (i) a sub-network policy receiver configured to receive policies from a policy store external to said associated management agent;
    (ii) a policy-conflict resolution mechanism arranged in operation to resolve at run time conflicts between different policies received by said sub-network policy receiver taking said stored policy-conflict resolution policies into account.

2. The system as claimed in claim 1 in which the policy-conflict resolution mechanism is operable to perform conflict detection.

3. The system as claimed in claim 2 in which the policy-conflict resolution mechanism is operable to detect a conflict if a network event triggers more than one policy.

4. The system as claimed in claim 1 in which the policy-conflict resolution mechanism is operable to identify a conflict ranking and to resolve the conflict according to the ranking.

5. The system as claimed in claim 1 in which the policy-conflict resolution mechanism is operable to perform at least one of the group consisting of:
    (i) identifying a method or dynamically loadable software which can be used to resolve the specific conflict and using the identified method or dynamically loadable software to resolve the respective conflict;
    (ii) identifying a policy creator rank and resolving the conflict according to the creator rank; and
    (iii) implementing a resolution policy inherent in the conflict management policy.

6. A method of distributed policy management in a computer network which includes a plurality of sub-networks, said method comprising:
    (i) configuring a plurality of interconnected components to have behavior determined by a plurality of policies;
    (ii) associating a sub-network management agent with each said sub-network;
    (iii) storing in each sub-network, policy-conflict resolution policies for one or more components in said sub-network;
    (iv) operating each associated sub-network management agent to:

(a) receive policies from a policy store external to said associated management agent; and
(b) determine at run time if, in respect of any given triggering event, a possible conflict may arise in respect of one or more of said received policies activated by said triggering event and, if so, passing each respective activated policy as an argument to a policy-conflict resolution process operating, as part of each sub-network management agent, in accordance with said stored policy-conflict management policies.

7. The method as claimed in claim 6 wherein said policy-conflict management policies used by each management agent differ between different management agents.

8. The method of claim 6 used to implement a computer network manager.

9. A computer network including a computer processor which acts as the computer network manager as claimed in claim 8.

10. A computer-readable computer program storage medium containing a program or a suite of programs comprising processor implementable instructions for causing a computer processor to carry out a method comprising:

(i) configuring a plurality of interconnected components to have behavior determined by a plurality of policies;
(ii) associating a sub-network management agent with each said sub-network;
(iii) storing in each sub-network, policy-conflict resolution policies for one or more components in said sub-network;
(iv) operating each associated sub-network of said management agent to:
  (a) receive policies from a policy store external to said associated management agent; and
  (b) determine at run time if, in respect of any given triggering event, a possible conflict may arise in respect of one or more of said received policies activated by said triggering event and, if so, passing each respective activated policy as an argument to a policy-conflict resolution process operating, as part of each sub-network management agent, in accordance with said stored policy-conflict management policies.

* * * * *